United States Patent
Peitzer

(10) Patent No.: US 10,117,145 B2
(45) Date of Patent: Oct. 30, 2018

(54) USER EQUIPMENT BASED FAST RETURN TO LTE

(71) Applicant: AT&T Mobility II LLC, Atlanta, GA (US)

(72) Inventor: Haywood Peitzer, Randolph, NJ (US)

(73) Assignee: AT&T MOBILITY II LLC, Atlanta, GA (US)

( * ) Notice: Subject to any disclaimer, the term of this patent is extended or adjusted under 35 U.S.C. 154(b) by 171 days.

(21) Appl. No.: 14/607,794

(22) Filed: Jan. 28, 2015

(65) Prior Publication Data

US 2016/0219486 A1    Jul. 28, 2016

(51) Int. Cl.
| | | |
|---|---|---|
| H04W 36/36 | (2009.01) | |
| H04W 36/02 | (2009.01) | |
| H04W 36/14 | (2009.01) | |

(52) U.S. Cl.
CPC .......... *H04W 36/023* (2013.01); *H04W 36/14* (2013.01)

(58) Field of Classification Search
None
See application file for complete search history.

(56) References Cited

U.S. PATENT DOCUMENTS

| | | |
|---|---|---|
| 7,333,451 B1 | 2/2008 | Khalil et al. |
| 8,285,290 B2 | 10/2012 | Arora et al. |
| 8,706,118 B2 | 4/2014 | Jaiswal et al. |
| 2008/0026756 A1* | 1/2008 | Harris ................. H04W 36/02 455/436 |
| 2009/0253434 A1 | 10/2009 | Hayashi et al. |
| 2010/0002650 A1* | 1/2010 | Ahluwalia ............ H04L 1/1874 370/331 |
| 2010/0002651 A1* | 1/2010 | Hofmann ............. H04W 36/02 370/331 |

(Continued)

FOREIGN PATENT DOCUMENTS

WO    2014101349 A1    7/2014

OTHER PUBLICATIONS

Chakraborty, et al. "Coordinating cellular background transfers using loadsense." Proceedings of the 19th annual international conference on Mobile computing & networking. ACM, 2013. http://www.cse.ohiostate.edu/~chunyi/cse5469_sp14/readings/chakraborty13-loadsense.pdf (p. 65; Figures 3-4).

(Continued)

*Primary Examiner* — Kouroush Mohebbi
(74) *Attorney, Agent, or Firm* — Amin, Turocy & Watson, LLP

(57) ABSTRACT

A system for delaying or inhibiting data is provided in order to shorten the time required for a reselection process from a first communication protocol to a second communication protocol. Reselection from the first communication protocol to the second communication protocol (e.g., 3G to 4G) requires a period of time without data transfers to allow the reselection to complete. The system delays or inhibits data transfers on the mobile device until the reselection process completes or the mobile device is idle for a predetermined length of time. In an embodiment, the system can buffer outgoing data and then send the data once the reselection has completed. In other embodiments, the system can drop packet sessions or ignore incoming packet pages. In another embodiment, the system can delay or inhibit data based on the priority of the data.

15 Claims, 9 Drawing Sheets

(56) References Cited

U.S. PATENT DOCUMENTS

| | | | |
|---|---|---|---|
| 2012/0307793 A1* | 12/2012 | Taneja | H04W 36/02 370/331 |
| 2013/0010656 A1 | 1/2013 | Chin et al. | |
| 2013/0034080 A1 | 2/2013 | Yang et al. | |
| 2013/0189987 A1 | 7/2013 | Klingenbrunn et al. | |
| 2013/0208605 A1 | 8/2013 | Bautista et al. | |
| 2014/0066067 A1 | 3/2014 | Karri | |
| 2014/0087723 A1 | 3/2014 | Cili et al. | |
| 2014/0106751 A1 | 4/2014 | Chen et al. | |
| 2014/0179319 A1 | 6/2014 | Kim et al. | |
| 2014/0247730 A1 | 9/2014 | Thota et al. | |
| 2014/0293961 A1 | 10/2014 | Khay-ibbat et al. | |
| 2014/0329529 A1 | 11/2014 | Jung et al. | |

OTHER PUBLICATIONS

Stemm, Mark. "Vertical Handoffs in Wireless Overlay Networks." Technical Report csd-96-903, University of California at Berkeley, May 1996. http://www.eecs.berkeley.edu/Pubs/TechRpts/1996/CSD-96-903.pdf (pp. 15-17 of Section 6).

Vehanen, Joona. "Handover between LTE and 3G Radio Access Technologies: Test measurement challenges and field environment test planning." (2011). https://aaltodoc.aalto.fi/bitstream/handle/123456789/3720/urn100472.pdf?sequence=1 (Figure 12 on p. 29; 4.3.3 on p. 45).

Xu, et al. "Efficiency of cache mechanism for network processors." Tsinghua Science and Technology, vol. 14 , Issue: 5, 2009 , pp. 575-585. http://ieeexplore.ieee.org/stamp/stamp.jsp?tp=&arnumber=6076255 (pp. 576-577).

Zhou, et al. "A cross-layer parallel handover optimization scheme for WiMAX networks." Military Communications Conference, 2011—MILCOM 2011, 2011 , pp. 699-704. http://digitalcommons.unl.edu/cgi/viewcontent.cgi?article=1106&context=computerelectronicfacpub.

Pandey, Basanta. "LTE-3G Inter-Operability Study." (2013). http://dspace.cc.tut.fi/dpub/bitstream/handle/123456789/21877/Pandey.pdf?sequence=3 (Sections 4.5 to 4.9 on pp. 36-39).

* cited by examiner

USER EQUIPMENT BASED FAST RETURN TO LTE

TECHNICAL FIELD

The subject disclosure relates to a system for improving a reselection process in a mobile communications environment.

BACKGROUND

Mobile devices can use a variety of communications protocols, but may not be able to use them simultaneously. The process of switching from one communication protocol to another can take some time, and the process can be delayed if data transfers are made before the reselection process has completed.

DETAILED DESCRIPTION

Figure 1:
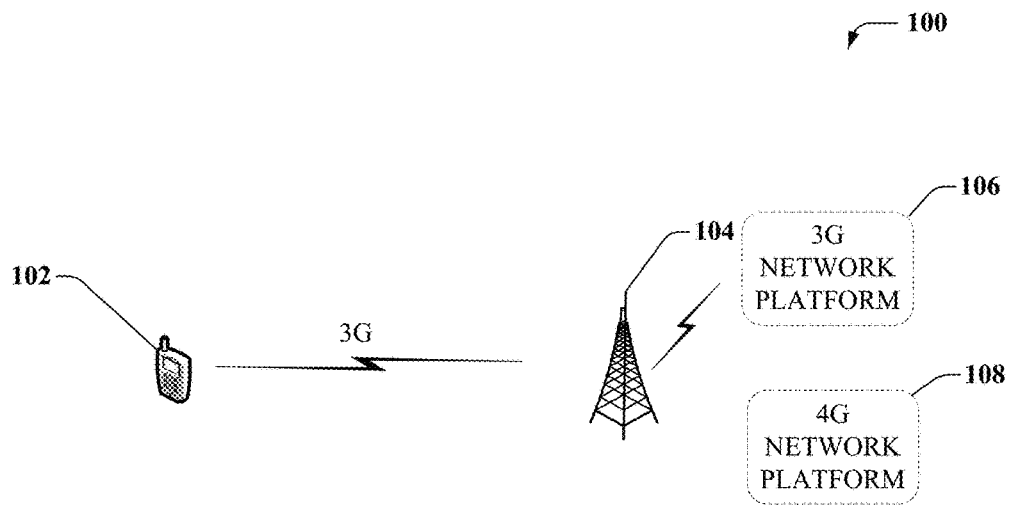
FIG. 1 is an example, non-limiting embodiment of a block diagram showing a mobile device using communicating with a 3G mobile network in accordance with various aspects described herein.

One or more embodiments are now described with reference to the drawings, wherein like reference numerals are used to refer to like elements throughout. In the following description, for purposes of explanation, numerous specific details are set forth in order to provide a thorough understanding of the various embodiments. It is evident, however, that the various embodiments can be practiced without these specific details (and without applying to any particular networked environment or standard).

To shorten the time required for a reselection process from a first communication protocol to a second communication protocol, a system for delaying or inhibiting data is provided. Reselection from the first communication protocol (or Radio Access Technology) to the second communication protocol (e.g., 3G to 4G and/or LTE) requires a period of time without data transfers to allow the reselection to complete. If applications on the mobile device, or background processes send data, or respond to incoming packet pages, the reselection process restarts until a minimum idle time is realized. The system delays or inhibits data transfers on the mobile device until the reselection process completes or the mobile device is idle for a predetermined length of time. In an embodiment, the system can buffer outgoing data and then send the data once the reselection has completed. In other embodiments, the system can drop packet sessions or ignore incoming packet pages.

In an embodiment, the system can delay or inhibit data based on the priority of the data. For example, a first set of data with a lower priority (e.g., background processes) may be delayed, but a second set of data with a higher priority level (e.g., voice, SMS, application based data) may be sent before the reselection process has completed.

For these considerations as well as other considerations, in one or more embodiments, a system includes a processor and a memory to store executable instructions that when executed by the processor, facilitate performance of operations, including determining that a mobile device is reselecting a mobile network communication from a first communication protocol to a second communication protocol. The operations also comprise delaying a first data transmission of the mobile device using the first communication protocol until the reselecting of the mobile network communication from the first communications protocol to the second communication protocol has been determined to have completed. The operations further comprise resuming the first data transmission using the second communication protocol.

In another embodiment, a method can comprise suspending, by a device comprising a processor, a first transmission of data in a first communication protocol from the device to a mobile network. The method can also include initiating, by the device, a reselection process with the mobile network from the first communication protocol to a second communication protocol. The method can also include resuming, by the device, the first transmission according to the second communication protocol in response to determining that the reselection process from the first communications protocol to the second communication protocol has been completed.

In another embodiment, a computer-readable storage device storing executable instructions that, in response to execution, cause a system comprising a processor to perform operations. The operations can include suspending a first transmission of data transmitted according to a first communication protocol from a device to a network, in response to determining that the first transmission of data does not satisfy a predetermined criterion related to priority. The operations can further include initiating, by the device, a reselection process with the mobile network from the first communication protocol to a second communication protocol. The operations can further include resuming, by the device, the first transmission according to a second communication protocol in response to determining that the reselection process from the first communications protocol to the second communication protocol has been completed.

Figure 2:
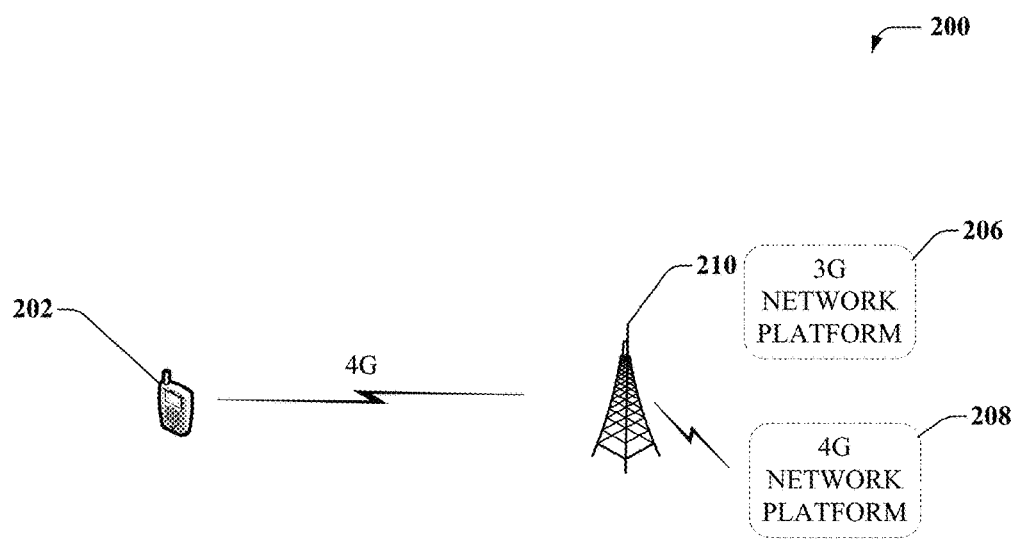
FIG. 2 is an example, non-limiting embodiment of a block diagram showing an improved reselection process mobile device using communicating with a 4G mobile network after reselection in accordance with various aspects described herein.

Turning now to FIG. 1, illustrated is an example, non-limiting embodiment of a block diagram 100 showing a mobile device using communicating with a 3G mobile network in accordance with various aspects described herein. In FIG. 1, mobile device 102 communicates with a mobile network via a macrocell device 104 (e.g., base station device) using a 3G network platform 106. The macrocell device 104 also is connected to a 4G network platform 108, but the mobile device 102 uses the radio access technology ("RAT") associated with the 3G network platform 106. In an embodiment, the mobile device 102 can be communicating using the 3G RAT during a voice call or data session when 4G may not have been available. Once the data session or the voice call comes to an end, the mobile device 102 can perform reselection or switch to 4G RAT as shown in the block diagram 200 in FIG. 2. In FIG. 2, the mobile device 202 communicates with the macrocell device 210 via the 4G network platform 208. The 3G network platform 206 is available if a voice call needs to be made, but otherwise is not used by mobile device 202 after reselection from 3G to 4G is performed.

It is to be appreciated that in both FIGS. 1 and 2 and throughout the specification, although the RATs are described as 3G and 4G, in other embodiments, other communications protocols can be used. For example, the reselection can be between 2G and 4G, 2G and 3G, or even between cellular protocols and non-cellular protocols (future generations of radio access technologies such as 5G and/or 6G, Wi-Fi, WiMAX, and etc). In an embodiment, the mobile device 102 and/or 202 can reselect from a lower priority mobile network to a higher priority mobile network. The priority of the networks can change and/or be adjusted based on what networks are available, usage, and other concerns. In another embodiment, the mobile devices 102 and/or 202 can reselect from a macrocell to a personal access point, femtocell device, or distributed antenna system.

Figure 3:
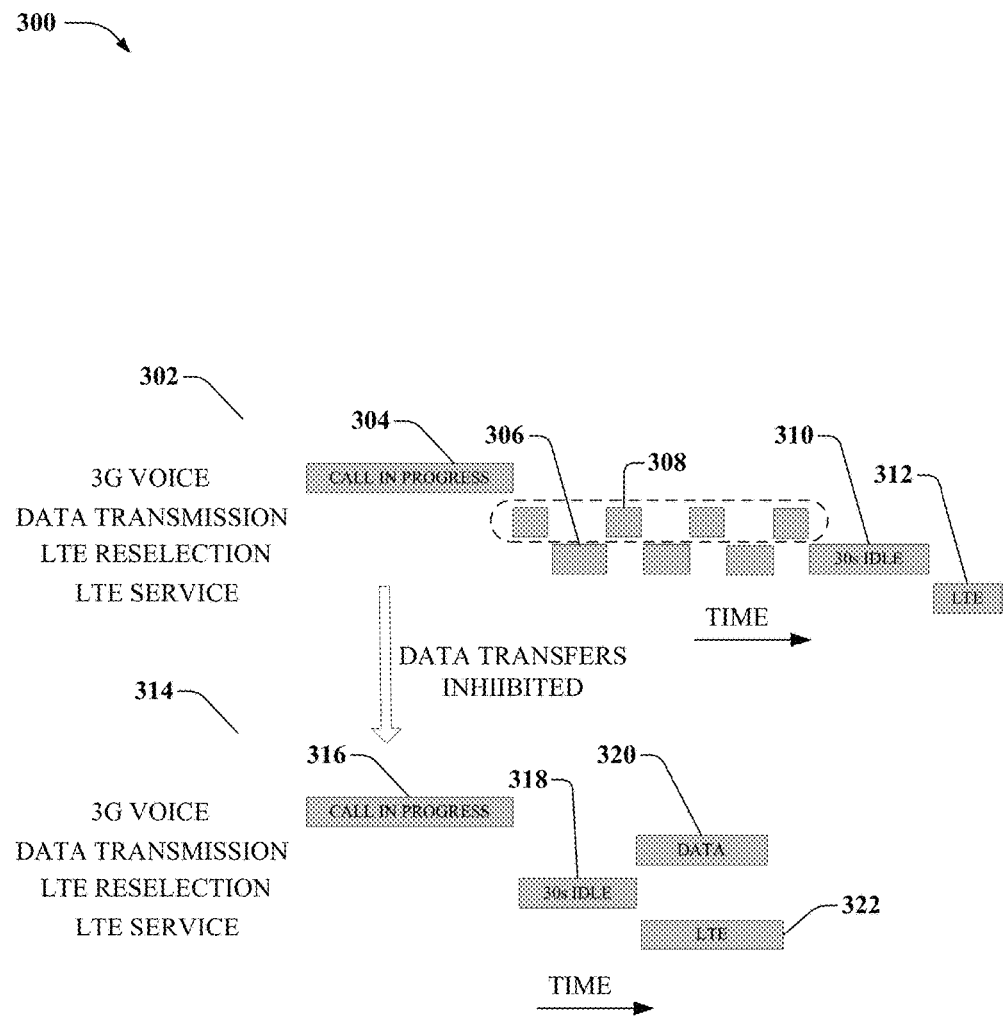
FIG. 3 is an example, non-limiting embodiment of a block diagram showing an improved reselection process in accordance with various aspects described herein.

Turning now to FIG. 3, illustrated is an example, non-limiting embodiment of a block diagram 300 showing an improved reselection process in accordance with various aspects described. Block diagram 300 depicts a unimproved reselection process 302 and contrasts it with the improved reselection process 314 with inhibited data as disclosed herein.

In 302, after a 3G voice call 304 ends, the mobile device attempts to reselect (e.g., 306) but is interrupted by occasional data transfers either incoming or outgoing (e.g., 308). Only when a sufficient amount of idle time without data transfers occurs, (e.g., 310) does the mobile device complete reselection, and LTE service 312 is resumed/initiated.

On the other hand, in the improved reselection process 314 as disclosed herein, after the 3G call 316 ends, data transfers can be inhibited and/or delayed for a predetermined period of time such that the reselection can proceed during the idle time at 318. Once the idle time has passed, and the LTE service has begun at 322, data transfers that were inhibited and/or delayed can proceed at 320.

In an embodiment, the data 308 and 320 can be application based data or network background process data (e.g., radio resource control related data). The data 308 and 320 can be incoming data or outgoing data to or from the mobile device, and a data inhibition component on the mobile device can delay and/or otherwise inhibit the data so that the reselection process can proceed at 318. In an embodiment, the data transfers can be inhibited and/or delayed for a predetermined length of time such as 30 seconds. In other embodiments, the data inhibition component can detect and/or otherwise determine when reselection has completed and stop inhibiting data after completion. The length of time that the data inhibition component blocks data can be adjusted based on the communications protocols that the mobile device is switching between, based on the network the mobile device is connected to, or based on user preferences. In an embodiment, the data inhibition component can allow data to be transferred after reselection has completed or if the reselection process takes longer than a predetermined length of time.

In other embodiments, the data inhibition component can delay and/or otherwise inhibit data based on a priority level of the data. For outgoing data, such priority levels can determine whether or not the data is blocked to ensure an idle time for the reselection process to proceed. For instance, voice data can have a high priority ranking and network background processes (such as radio resource control reports, mobility management data, etc) can have a lower priority ranking, with other applications having priority rankings falling in between. The data inhibition component can delay or block data that has a priority ranking below a predetermined ranking, while allowing data transfers above the predetermined ranking to proceed. Similarly, for incoming data transfers, based on priority level associated with an incoming packet page, the data inhibition component will allow or disallow the mobile device to respond to the packet page.

In an embodiment, the mobile device can buffer the data during the idle period and then transmit the data to the network once the reselection process has completed. In an embodiment, the buffering continues until reselection is complete, and in another embodiment, the buffering continues for an adjustable or non-adjustable predetermined length of time. In yet other embodiments, the buffering can continue until a memory device associated with the buffering is full or reaches a predetermined capacity. In some embodiments, the data above or below a predetermined ranking can be buffered while other data can either be allowed to be transmitted, or can be ignored and/or blocked completely. If the buffer or memory device reaches the predetermined capacity, subsequent data can either be block/ignored or allowed to be transmitted through to the mobile network. In yet other embodiments, in response to determining that the buffer is full and before the reselecting has been determined to have completed, the data inhibition component can drop a packet session associated with the data transmission.

Figure 4:
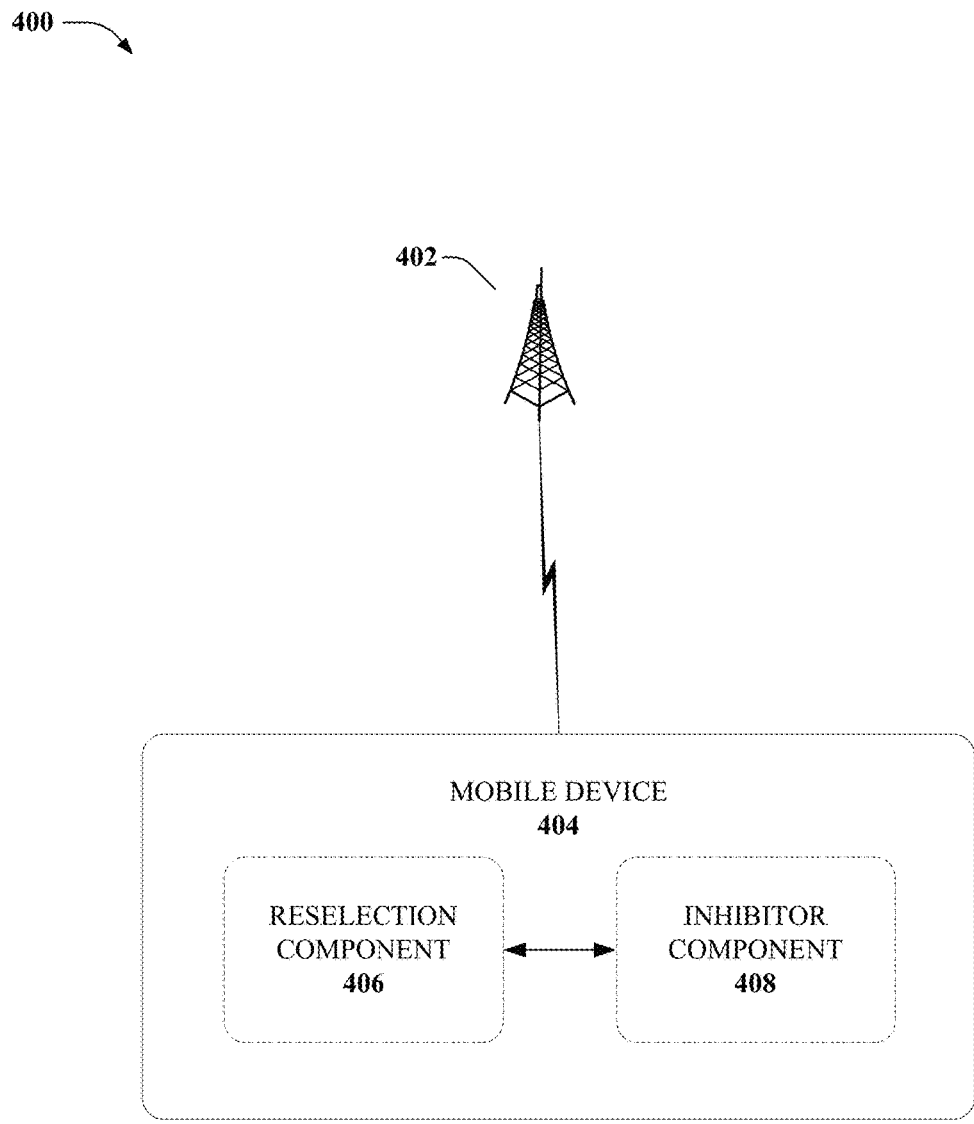
FIG. 4 is an example, non-limiting embodiment of a block diagram showing a reselection system in accordance with various aspects described herein.

Turning now to FIG. 4, illustrated is an example, non-limiting embodiment of a block diagram 400 showing a reselection system on a mobile device 404 in accordance with various aspects described herein. The mobile device 404 can send and receive transmissions to and from a macrocell device 402 using either 3G or 4G radio access technologies. After a voice call or other data transmission using 3G radio access technology, a reselection component 406 on mobile device 404 can be configured to initiate a reselection process with the mobile network from a first communication protocol (e.g., 3G) to a second communication protocol (e.g., 4G/LTE). In other embodiments, other communications protocols can be used. For example, the reselection can be between 2G and 4G, 2G and 3G, or even between cellular protocols and non-cellular protocols (future generations of radio access technologies such as 5G and/or 6G, Wi-Fi, WiMAX, and etc). In an embodiment, the reselection component 406 can reselect from a lower priority mobile network to a higher priority mobile network. The priority of the networks can change and/or be adjusted based on what networks are available, usage, and other concerns. In another embodiment, the reselection component 406 can reselect from a macrocell (e.g., macrocell device 402) to a personal access point, femtocell device, or distributed antenna system.

In an embodiment, reselection component 406 can initiate reselection from the first communication protocol to the second communication protocol in response to a data transmission associated with the first communication protocol ending. An inhibitor component 408 can be provided to delay a data transmission of the mobile device using the first communication protocol until the reselecting of the mobile network communication from the first communications protocol to the second communication protocol has been determined to have completed by the reselection component 406. In an embodiment, the inhibitor component 408 can initiate the data blocking/delaying in response to determining that the reselection component 406 has initiated reselection. In an embodiment, the reselection component 406 can send a notification to the inhibitor component 408 that reselection has began.

The inhibitor component 408 can inhibit and/or delay data transmissions for a predetermined and/or adjustable period of time such that the reselection can proceed during the idle time. In other embodiments, the inhibitor component 408 can inhibit and/or delay data transmissions until the reselection component 406 completes the reselection. Reselection component 406 can send a notification to the inhibitor component 408 that reselection has been completed.

In an embodiment, the data that is blocked can be application based data or network background process data (e.g., radio resource control related data). The data can be incoming data or outgoing data to or from the mobile device 404, and the inhibitor component 408 on the mobile device 404 can delay and/or otherwise inhibit the data so that the reselection component 406 can complete reselection. In an embodiment, the data inhibited can include circuit switched communications such as phone calls over 3G network, as well as voice over LTE ("VoLTE"), video, and other forms of packet switched data communications. In an embodiment, the data transfers can be inhibited and/or delayed for a predetermined length of time such as 30 seconds. In other embodiments, the inhibitor component 408 can detect and/or otherwise determine when reselection has completed and stop inhibiting data after completion. The length of time that the data inhibition component blocks data can be adjusted based on the communications protocols that the mobile device is switching to and from, based on the network the mobile device is connected to, or based on user preferences. In an embodiment, the inhibitor component 408 can allow data to be transferred after reselection has completed or if the reselection process takes longer than a predetermined length of time.

Figure 5:
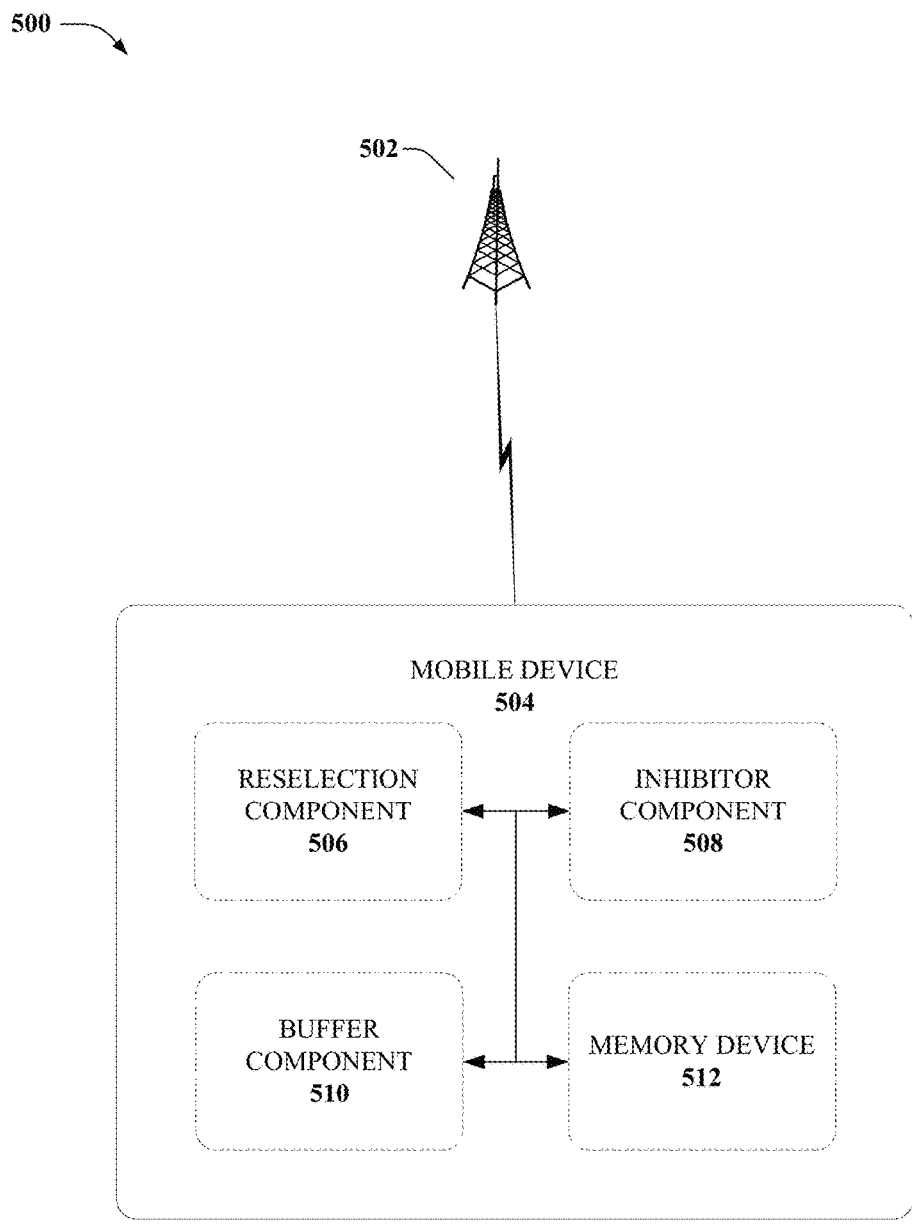
FIG. 5 is an example, non-limiting embodiment of a block diagram showing a reselection system in accordance with various aspects described herein.

Turning now to FIG. 5, illustrated is an example, non-limiting embodiment of a block diagram 500 showing a reselection system on a mobile device 504 in accordance with various aspects described herein. The mobile device 504 can send and receive transmissions to and from a macrocell device 502 using either 3G or 4G radio access technologies. After a voice call or other data transmission using 3G radio access technology, a reselection component 506 on mobile device 504 can be configured to initiate a reselection process with the mobile network from a first communication protocol (e.g., 3G) to a second communication protocol (e.g., 4G/LTE).

In an embodiment, reselection component 506 can initiate reselection from the first communication protocol to the second communication protocol in response to a data transmission associated with the first communication protocol ending. An inhibitor component 508 can be provided to delay a data transmission of the mobile device using the first communication protocol until the reselecting of the mobile network communication from the first communications protocol to the second communication protocol has been determined to have completed by the reselection component 506.

In an embodiment, a buffer component 510 can be provided to buffer data that is being delayed and/or inhibited by the inhibitor component 508. The buffer component 510 can continue buffering data until the reselection component 506 has completed reselection from the first communication protocol to the second communication protocol. In another embodiment, the buffer component 510 can continue to buffer data for an adjustable or non-adjustable predetermined length of time. In yet other embodiments, the buffering can continue until a memory device 512 associated with the buffering is full or reaches a predetermined capacity. In some embodiments, the data above or below a predetermined ranking can be buffered by the buffer component 510 while other data can either be allowed to be transmitted, or can be ignored and/or blocked partially or completely. If the memory device 512 reaches the predetermined capacity, subsequent data can either be block/ignored or allowed to be transmitted through to the mobile network. In yet other embodiments, in response to determining that the buffer is full and before the reselecting has been determined to have completed, the inhibitor component 508 can drop a packet session associated with the data transmission.

Figure 6:
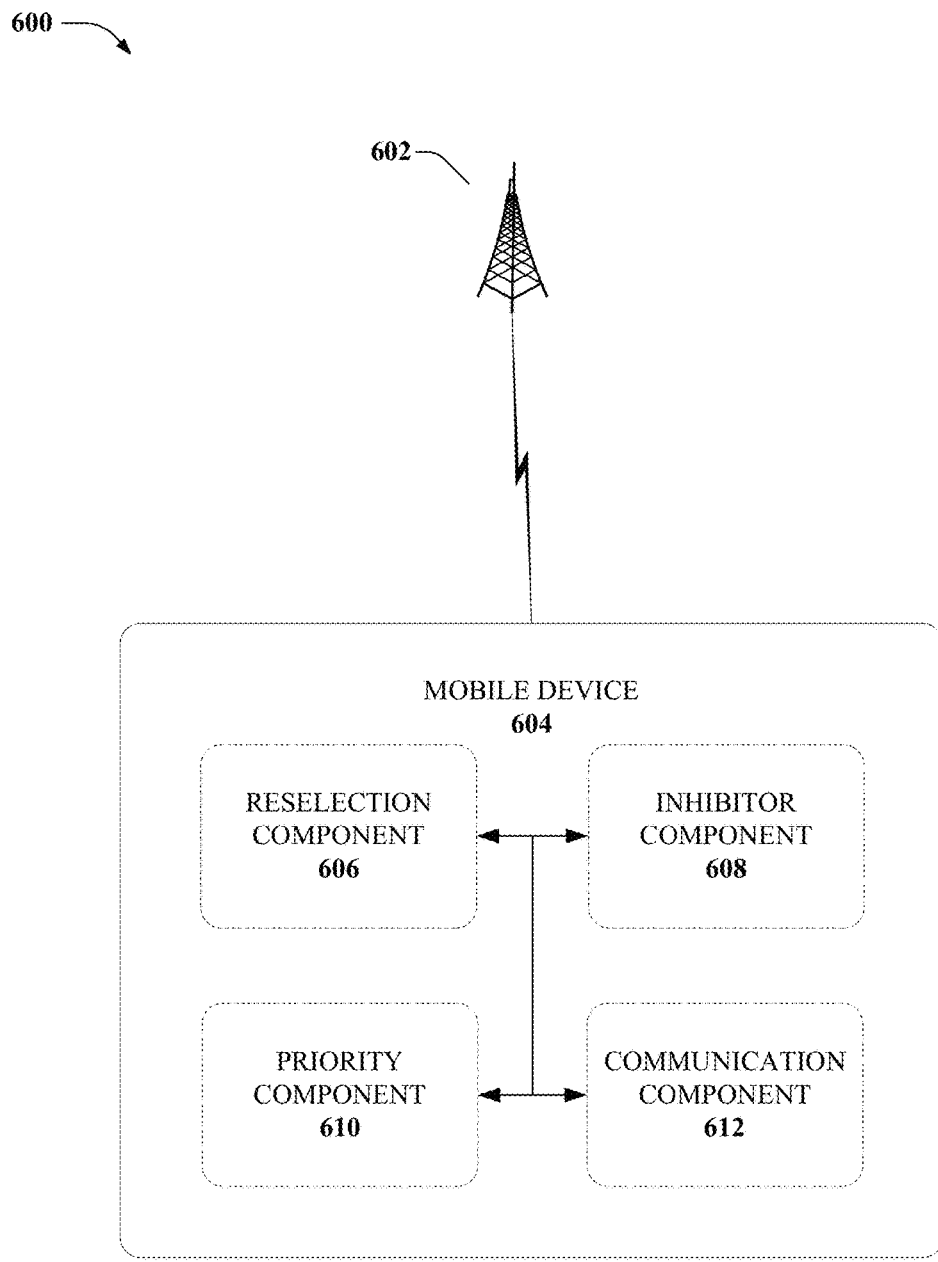
FIG. 6 is an example, non-limiting embodiment of a block diagram showing a reselection system in accordance with various aspects described herein.

Turning now to FIG. 6, illustrated is an example, non-limiting embodiment of a block diagram 600 showing a reselection system on a mobile device 604 in accordance with various aspects described herein. The mobile device 604 can send and receive transmissions to and from a macrocell device 602 using either 3G or 4G radio access technologies. After a voice call or other data transmission using 3G radio access technology, a reselection component 606 on mobile device 604 can be configured to initiate a reselection process with the mobile network from a first communication protocol (e.g., 3G) to a second communication protocol (e.g., 4G/LTE).

In an embodiment, reselection component 606 can initiate reselection from the first communication protocol to the second communication protocol in response to a data transmission associated with the first communication protocol ending. An inhibitor component 608 can be provided to delay a data transmission of the mobile device using the first communication protocol until the reselecting of the mobile network communication from the first communications protocol to the second communication protocol has been determined to have completed by the reselection component 606.

In an embodiment, a priority component 610 can rank data based on the priority of the data. Priority component 610 can also determine the priority of the data based on received rankings (either from the mobile network or from applications associated with the data. The inhibitor component 608 can delay and/or otherwise inhibit data based on a priority level of the data. For outgoing data, such priority levels can determine whether or not the data is blocked to ensure an idle time for the reselection process to proceed. For instance, voice data can have a high priority ranking and network background processes (such as radio resource control reports, mobility management data, etc) can have a lower priority ranking, with other applications having priority rankings falling in between. The inhibitor component 608 can delay or block data that has a priority ranking below a predetermined ranking, while allowing data transfers above the predetermined ranking to proceed. Similarly, for incoming data transfers received via a communication component 612, priority component 610 can determine the priority level of the incoming data and determine whether the priority is sufficiently high to interrupt the reselection process.

Figure 7:
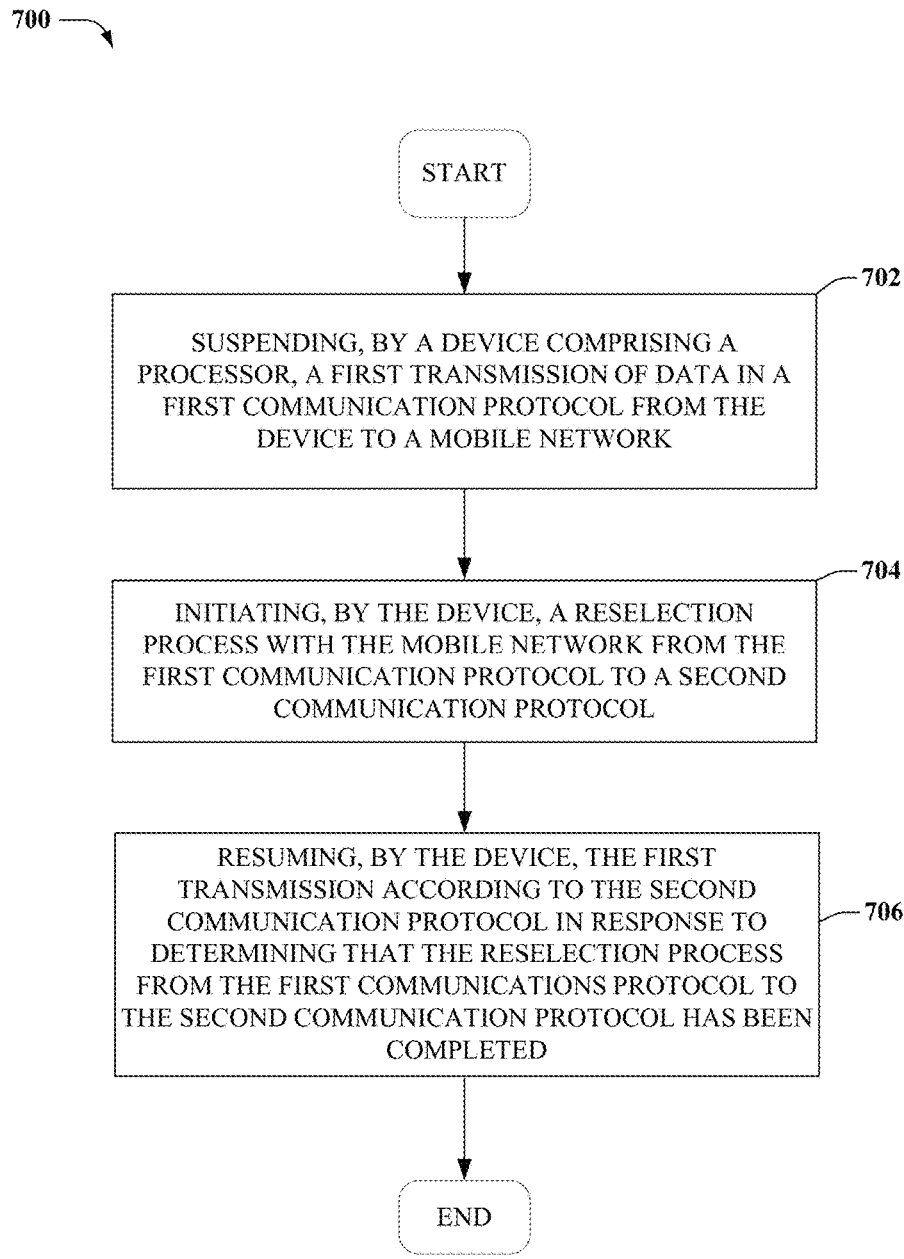
FIG. 7 illustrates a flow diagram of an example, non-limiting embodiment of a method for inhibiting data to enable an improved reselection process as described herein.

FIG. 7 illustrates a process in connection with the aforementioned systems. The process in FIG. 7 can be implemented for example by systems 100-600 as illustrated in FIGS. 1-6 respectively. While for purposes of simplicity of explanation, the methods are shown and described as a series of blocks, it is to be understood and appreciated that the claimed subject matter is not limited by the order of the blocks, as some blocks may occur in different orders and/or concurrently with other blocks from what is depicted and described herein. Moreover, not all illustrated blocks may be required to implement the methods described hereinafter.

FIG. 7 illustrates a flow diagram of a method for inhibiting data to enable an improved reselection process as described herein. The method 700 can start at 702 where a first transmission of data is suspended (e.g., by the inhibitor component 408) in a first communication protocol from a mobile device to a mobile network. The first communication protocol can be a 3G communication protocol, and the data can be delayed and/or blocked by the inhibitor component. In some embodiments the data can be buffered until the first transmission is resumed.

At 704, the method can include initiating (e.g., by the reselection component 406) a reselection process with the mobile network from the first communication protocol to a second communication protocol. In some embodiments, the reselection process is initiated after the data is inhibited, and in other embodiments, the reselection process can initiate, and then in response to the reselection process, the first transmission of data can be blocked or delayed. At 706, the method includes resuming (e.g., by the inhibitor component 408), the first transmission according to the second communication protocol in response to determining that the reselection process from the first communications protocol to the second communication protocol has been completed. In some embodiments, the first transmission can be resumed after a predetermined length of time, or after a buffer in which the first transmission was saved in is filled or reaches a predetermined capacity.

Figure 8:
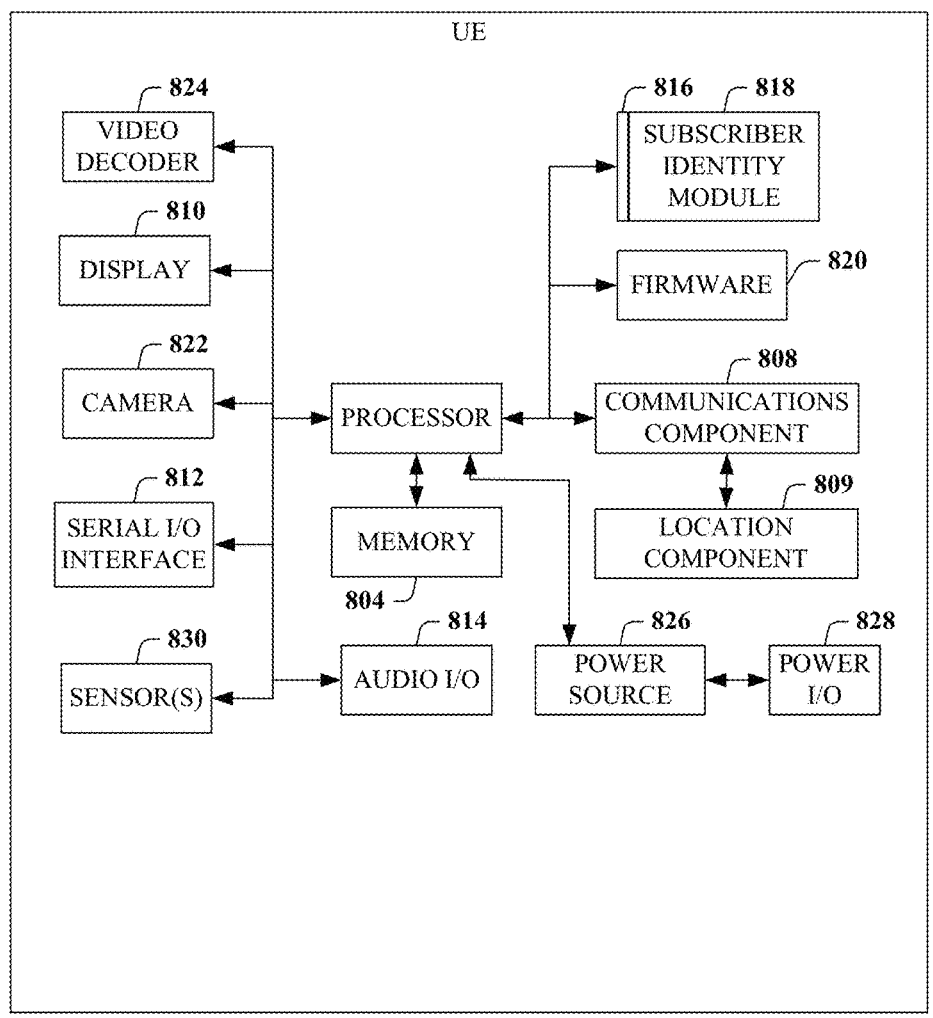
FIG. 8 illustrates a block diagram of a user equipment (UE) suitable for inhibiting data to improve reselection in accordance with the subject disclosure.

Referring now to FIG. 8, there is illustrated a block diagram of a mobile device or UE 800 that performs a reselection process from one communication protocol to another communication protocol in accordance with the various embodiments. The UE 800 can include a processor 802 for controlling all onboard operations and processes. A memory 804 can interface to the processor 802 for storage of data and one or more applications 806 being executed by the processor 802. A communications component 808 can interface to the processor 802 to facilitate wired/wireless communication with external systems (e.g., femtocell and macro cell). The communications component 808 interfaces to a location component 809 (e.g., GPS transceiver) that can facilitate location detection of the UE 800. Note that the location component 809 can also be included as part of the communications component 808.

The UE 800 can include a display 810 for displaying content downloaded and/or for displaying text information related to operating and using the device features. A serial I/O interface 812 is provided in communication with the processor 802 to facilitate serial communication (e.g., USB, and/or IEEE 1394) via a hardwire connection. Audio capabilities are provided with an audio I/O component 814, which can include a speaker for the output of audio signals related to, for example, recorded data or telephony voice data, and a microphone for inputting voice signals for recording and/or telephone conversations. In addition, sensor(s) 830 can be included to detect usage activity of the UE 800 and/or to detect position, motion and/or orientation of the UE 800.

The UE 800 can include a slot interface 816 for accommodating a subscriber identity module (SIM) 818. Firmware 820 is also provided to store and provide to the processor 802 startup and operational data. The UE 800 can also include an image capture component 822 such as a camera and/or a video decoder 824 for decoding encoded multimedia content. The UE 800 can also include a power source 826 in the form of batteries, which interfaces to an external power system or charging equipment via a power I/O component 828. In addition, the UE 800 can be substantially similar to and include functionality associated with mobile devices 102, 202, 404 and 504 described herein.

Figure 9:
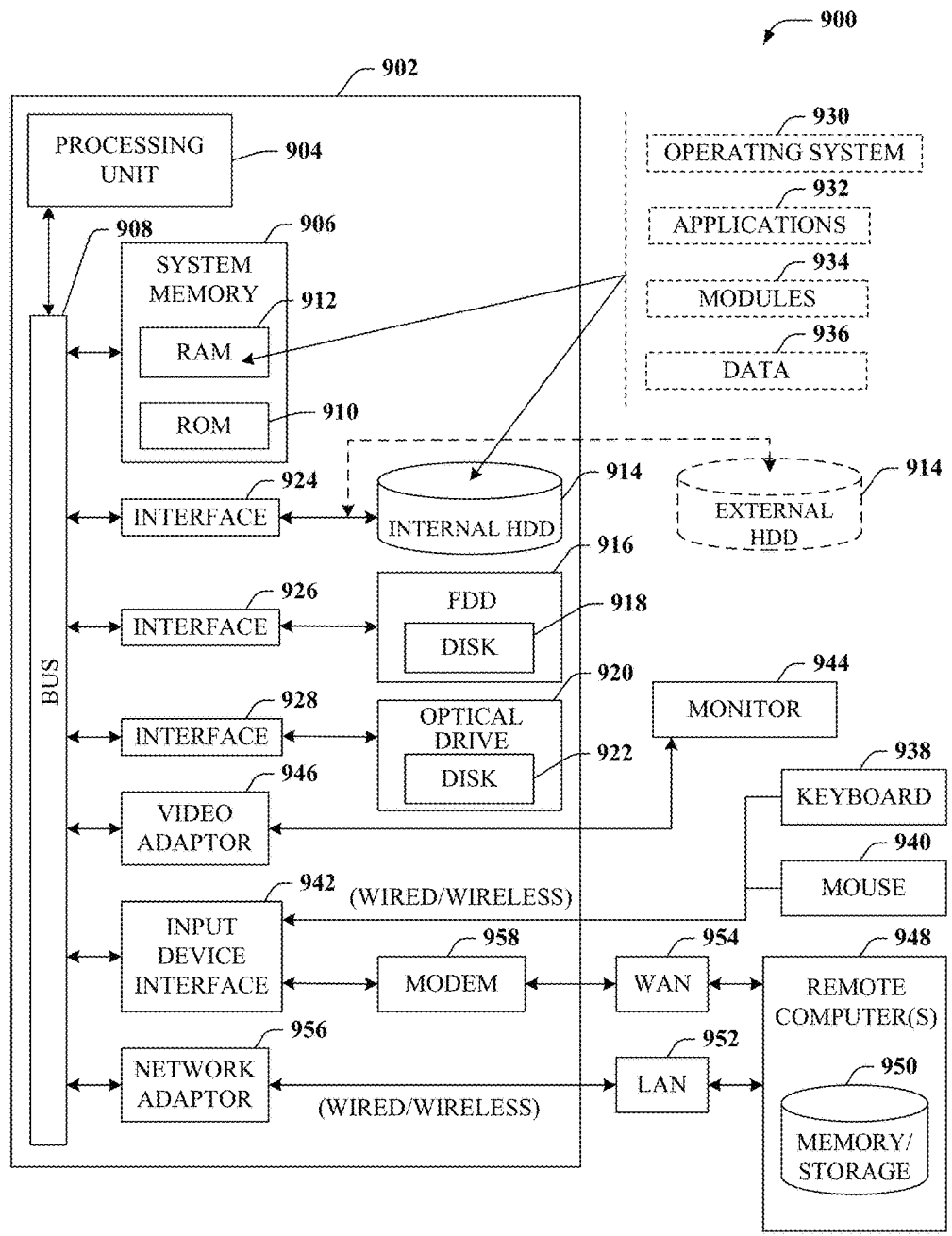
FIG. 9 is a block diagram of an example, non-limiting embodiment of a computing environment in accordance with various aspects described herein.

Referring now to FIG. 9, there is illustrated a block diagram of a computing environment in accordance with various aspects described herein. For example, in some embodiments, the computer can be or be included within the radio repeater system disclosed in any of the previous systems 200, 300, 400, 500, 600 and/or 700.

In order to provide additional context for various embodiments described herein, FIG. 9 and the following discussion are intended to provide a brief, general description of a suitable computing environment 900 in which the various embodiments of the embodiment described herein can be implemented. While the embodiments have been described above in the general context of computer-executable instructions that can run on one or more computers, those skilled in the art will recognize that the embodiments can be also implemented in combination with other program modules and/or as a combination of hardware and software.

Generally, program modules include routines, programs, components, data structures, etc., that perform particular tasks or implement particular abstract data types. Moreover, those skilled in the art will appreciate that the inventive methods can be practiced with other computer system configurations, including single-processor or multiprocessor computer systems, minicomputers, mainframe computers, as well as personal computers, hand-held computing devices, microprocessor-based or programmable consumer electronics, and the like, each of which can be operatively coupled to one or more associated devices.

The terms "first," "second," "third," and so forth, as used in the claims, unless otherwise clear by context, is for clarity only and doesn't otherwise indicate or imply any order in time. For instance, "a first determination," "a second determination," and "a third determination," does not indicate or imply that the first determination is to be made before the second determination, or vice versa, etc.

The illustrated embodiments of the embodiments herein can be also practiced in distributed computing environments where certain tasks are performed by remote processing devices that are linked through a communications network. In a distributed computing environment, program modules can be located in both local and remote memory storage devices.

Computing devices typically include a variety of media, which can include computer-readable storage media and/or communications media, which two terms are used herein differently from one another as follows. Computer-readable storage media can be any available storage media that can be accessed by the computer and includes both volatile and nonvolatile media, removable and non-removable media. By way of example, and not limitation, computer-readable storage media can be implemented in connection with any method or technology for storage of information such as computer-readable instructions, program modules, structured data or unstructured data.

Computer-readable storage media can include, but are not limited to, random access memory (RAM), read only memory (ROM), electrically erasable programmable read only memory (EEPROM), flash memory or other memory technology, compact disk read only memory (CD-ROM), digital versatile disk (DVD) or other optical disk storage, magnetic cassettes, magnetic tape, magnetic disk storage or other magnetic storage devices or other tangible and/or non-transitory media which can be used to store desired information. In this regard, the terms "tangible" or "non-transitory" herein as applied to storage, memory or computer-readable media, are to be understood to exclude only propagating transitory signals per se as modifiers and do not relinquish rights to all standard storage, memory or computer-readable media that are not only propagating transitory signals per se.

Computer-readable storage media can be accessed by one or more local or remote computing devices, e.g., via access requests, queries or other data retrieval protocols, for a variety of operations with respect to the information stored by the medium.

Communications media typically embody computer-readable instructions, data structures, program modules or other structured or unstructured data in a data signal such as a modulated data signal, e.g., a carrier wave or other transport mechanism, and includes any information delivery or transport media. The term "modulated data signal" or signals refers to a signal that has one or more of its characteristics set or changed in such a manner as to encode information in one or more signals. By way of example, and not limitation, communication media include wired media, such as a wired network or direct-wired connection, and wireless media such as acoustic, RF, infrared and other wireless media.

With reference again to FIG. 9, the example environment 900 for implementing various embodiments of the aspects described herein includes a computer 902, the computer 902 including a processing unit 904, a system memory 906 and a system bus 908. The system bus 908 couples system components including, but not limited to, the system memory 906 to the processing unit 904. The processing unit 904 can be any of various commercially available processors. Dual microprocessors and other multi-processor architectures can also be employed as the processing unit 904.

The system bus 908 can be any of several types of bus structure that can further interconnect to a memory bus (with or without a memory controller), a peripheral bus, and a local bus using any of a variety of commercially available bus architectures. The system memory 906 includes ROM 910 and RAM 912. A basic input/output system (BIOS) can be stored in a non-volatile memory such as ROM, erasable programmable read only memory (EPROM), EEPROM, which BIOS contains the basic routines that help to transfer information between elements within the computer 902, such as during startup. The RAM 912 can also include a high-speed RAM such as static RAM for caching data.

The computer 902 further includes an internal hard disk drive (HDD) 914 (e.g., EIDE, SATA), which internal hard disk drive 914 can also be configured for external use in a suitable chassis (not shown), a magnetic floppy disk drive (FDD) 916, (e.g., to read from or write to a removable diskette 918) and an optical disk drive 920, (e.g., reading a CD-ROM disk 922 or, to read from or write to other high capacity optical media such as the DVD). The hard disk drive 914, magnetic disk drive 916 and optical disk drive 920 can be connected to the system bus 908 by a hard disk drive interface 924, a magnetic disk drive interface 926 and an optical drive interface 928, respectively. The interface 924 for external drive implementations includes at least one or both of Universal Serial Bus (USB) and Institute of Electrical and Electronics Engineers (IEEE) 994 interface technologies. Other external drive connection technologies are within contemplation of the embodiments described herein.

The drives and their associated computer-readable storage media provide nonvolatile storage of data, data structures, computer-executable instructions, and so forth. For the computer 902, the drives and storage media accommodate the storage of any data in a suitable digital format. Although the description of computer-readable storage media above refers to a hard disk drive (HDD), a removable magnetic diskette, and a removable optical media such as a CD or DVD, it should be appreciated by those skilled in the art that other types of storage media which are readable by a computer, such as zip drives, magnetic cassettes, flash memory cards, cartridges, and the like, can also be used in the example operating environment, and further, that any such storage media can contain computer-executable instructions for performing the methods described herein.

A number of program modules can be stored in the drives and RAM 912, including an operating system 930, one or more application programs 932, other program modules 934 and program data 936. All or portions of the operating system, applications, modules, and/or data can also be cached in the RAM 912. The systems and methods described herein can be implemented utilizing various commercially available operating systems or combinations of operating systems.

A user can enter commands and information into the computer 902 through one or more wired/wireless input devices, e.g., a keyboard 938 and a pointing device, such as a mouse 940. Other input devices (not shown) can include a microphone, an infrared (IR) remote control, a joystick, a game pad, a stylus pen, touch screen or the like. These and other input devices are often connected to the processing unit 904 through an input device interface 942 that can be coupled to the system bus 908, but can be connected by other interfaces, such as a parallel port, an IEEE 1394 serial port, a game port, a universal serial bus (USB) port, an IR interface, etc.

A monitor 944 or other type of display device can be also connected to the system bus 908 via an interface, such as a video adapter 946. In addition to the monitor 944, a computer typically includes other peripheral output devices (not shown), such as speakers, printers, etc.

The computer 902 can operate in a networked environment using logical connections via wired and/or wireless communications to one or more remote computers, such as a remote computer(s) 948. The remote computer(s) 948 can be a workstation, a server computer, a router, a personal computer, portable computer, microprocessor-based entertainment appliance, a peer device or other common network node, and typically includes many or all of the elements described relative to the computer 902, although, for purposes of brevity, only a memory/storage device 950 is illustrated. The logical connections depicted include wired/wireless connectivity to a local area network (LAN) 952 and/or larger networks, e.g., a wide area network (WAN) 954. Such LAN and WAN networking environments are commonplace in offices and companies, and facilitate enterprise-wide computer networks, such as intranets, all of which can connect to a global communications network, e.g., the Internet.

When used in a LAN networking environment, the computer 902 can be connected to the local network 952 through a wired and/or wireless communication network interface or adapter 956. The adapter 956 can facilitate wired or wireless communication to the LAN 952, which can also include a wireless AP disposed thereon for communicating with the wireless adapter 956.

When used in a WAN networking environment, the computer 902 can include a modem 958 or can be connected to a communications server on the WAN 954 or has other means for establishing communications over the WAN 954, such as by way of the Internet. The modem 958, which can be internal or external and a wired or wireless device, can be connected to the system bus 908 via the input device interface 942. In a networked environment, program modules depicted relative to the computer 902 or portions thereof, can be stored in the remote memory/storage device 950. It will be appreciated that the network connections shown are example and other means of establishing a communications link between the computers can be used.

The computer 902 can be operable to communicate with any wireless devices or entities operatively disposed in wireless communication, e.g., a printer, scanner, desktop and/or portable computer, portable data assistant, communications satellite, any piece of equipment or location associated with a wirelessly detectable tag (e.g., a kiosk, news stand, restroom), and telephone. This can include Wireless Fidelity (Wi-Fi) and BLUETOOTH® wireless technologies. Thus, the communication can be a predefined structure as with a conventional network or simply an ad hoc communication between at least two devices.

Wi-Fi can allow connection to the Internet from a couch at home, a bed in a hotel room or a conference room at work, without wires. Wi-Fi is a wireless technology similar to that used in a cell phone that enables such devices, e.g., computers, to send and receive data indoors and out; anywhere within the range of a base station. Wi-Fi networks use radio technologies called IEEE 802.11 (a, b, g, n, ac, etc.) to provide secure, reliable, fast wireless connectivity. A Wi-Fi network can be used to connect computers to each other, to the Internet, and to wired networks (which can use IEEE 802.3 or Ethernet). Wi-Fi networks operate in the unlicensed 2.4 and 5 GHz radio bands, at an 11 Mbps (802.11a) or 54 Mbps (802.11b) data rate, for example or with products that contain both bands (dual band), so the networks can provide real-world performance similar to the basic 10BaseT wired Ethernet networks used in many offices.

Figure 10:
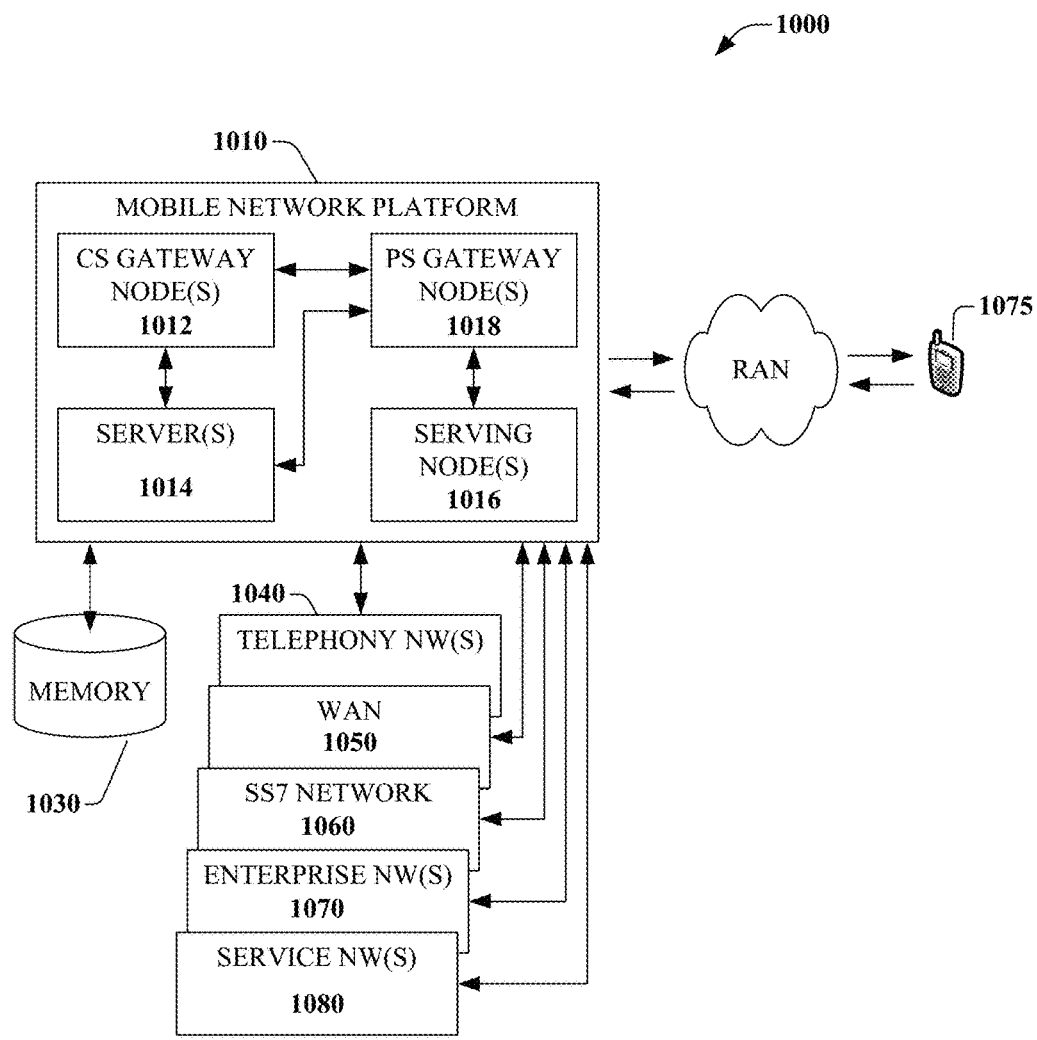
FIG. 10 is a block diagram of an example, non-limiting embodiment of a mobile network platform in accordance with various aspects described herein.

FIG. 10 presents an example embodiment 1000 of a mobile network platform 1010 that can implement and exploit one or more aspects of the disclosed subject matter described herein. Generally, wireless network platform 1010 can include components, e.g., nodes, gateways, interfaces, servers, or disparate platforms, that facilitate both packet-switched (PS) (e.g., internet protocol (IP), frame relay, asynchronous transfer mode (ATM)) and circuit-switched (CS) traffic (e.g., voice and data), as well as control generation for networked wireless telecommunication. As a non-limiting example, wireless network platform 1010 can be included in telecommunications carrier networks, and can be considered carrier-side components as discussed elsewhere herein. Mobile network platform 1010 includes CS gateway node(s) 1012 which can interface CS traffic received from legacy networks like telephony network(s) 1040 (e.g., public switched telephone network (PSTN), or public land mobile network (PLMN)) or a signaling system #7 (SS7) network 1070. Circuit switched gateway node(s) 1012 can authorize and authenticate traffic (e.g., voice) arising from such networks. Additionally, CS gateway node(s) 1012 can access mobility, or roaming, data generated through SS7 network 1070; for instance, mobility data stored in a visited location register (VLR), which can reside in memory 1030. Moreover, CS gateway node(s) 1012 interfaces CS-based traffic and signaling and PS gateway node(s) 1018. As an example, in a 3GPP UMTS network, CS gateway node(s) 1012 can be realized at least in part in gateway GPRS support node(s) (GGSN). It should be appreciated that functionality and specific operation of CS gateway node(s) 1012, PS gateway node(s) 1018, and serving node(s) 1016, is provided and dictated by radio technology(ies) utilized by mobile network platform 1010 for telecommunication.

In addition to receiving and processing CS-switched traffic and signaling, PS gateway node(s) 1018 can authorize and authenticate PS-based data sessions with served mobile devices. Data sessions can include traffic, or content(s), exchanged with networks external to the wireless network platform 1010, like wide area network(s) (WANs) 1050, enterprise network(s) 1070, and service network(s) 1080, which can be embodied in local area network(s) (LANs), can also be interfaced with mobile network platform 1010 through PS gateway node(s) 1018. It is to be noted that WANs 1050 and enterprise network(s) 1060 can embody, at least in part, a service network(s) like IP multimedia subsystem (IMS). Based on radio technology layer(s) available in technology resource(s) 1017, packet-switched gateway node(s) 1018 can generate packet data protocol contexts when a data session is established; other data structures that facilitate routing of packetized data also can be generated. To that end, in an aspect, PS gateway node(s) 1018 can include a tunnel interface (e.g., tunnel termination gateway (TTG) in 3GPP UMTS network(s) (not shown)) which can facilitate packetized communication with disparate wireless network(s), such as Wi-Fi networks.

In embodiment 1000, wireless network platform 1010 also includes serving node(s) 1016 that, based upon available radio technology layer(s) within technology resource(s) 1017, convey the various packetized flows of data streams received through PS gateway node(s) 1018. It is to be noted that for technology resource(s) 1017 that rely primarily on CS communication, server node(s) can deliver traffic without reliance on PS gateway node(s) 1018; for example, server node(s) can embody at least in part a mobile switching center. As an example, in a 3GPP UMTS network, serving node(s) 1016 can be embodied in serving GPRS support node(s) (SGSN).

For radio technologies that exploit packetized communication, server(s) 1014 in wireless network platform 1010 can execute numerous applications that can generate multiple disparate packetized data streams or flows, and manage (e.g., schedule, queue, format . . . ) such flows. Such application(s) can include add-on features to standard services (for example, provisioning, billing, customer support . . . ) provided by wireless network platform 1010. Data streams (e.g., content(s) that are part of a voice call or data session) can be conveyed to PS gateway node(s) 1018 for authorization/authentication and initiation of a data session, and to serving node(s) 1016 for communication thereafter. In addition to application server, server(s) 1014 can include utility server(s), a utility server can include a provisioning server, an operations and maintenance server, a security server that can implement at least in part a certificate authority and firewalls as well as other security mechanisms, and the like. In an aspect, security server(s) secure communication served through wireless network platform 1010 to ensure network's operation and data integrity in addition to authorization and authentication procedures that CS gateway node(s) 1012 and PS gateway node(s) 1018 can enact. Moreover, provisioning server(s) can provision services from external network(s) like networks operated by a disparate service provider; for instance, WAN 1050 or Global Positioning System (GPS) network(s) (not shown). Provisioning server(s) can also provision coverage through networks associated to wireless network platform 1010 (e.g., deployed and operated by the same service provider), such as femtocell network(s) (not shown) that enhance wireless service coverage within indoor confined spaces and offload RAN resources in order to enhance subscriber service experience within a home or business environment by way of UE 1075.

It is to be noted that server(s) 1014 can include one or more processors configured to confer at least in part the functionality of macro network platform 1010. To that end, the one or more processor can execute code instructions stored in memory 1030, for example. It is should be appreciated that server(s) 1014 can include a content manager 1015, which operates in substantially the same manner as described hereinbefore.

In example embodiment 1000, memory 1030 can store information related to operation of wireless network platform 1010. Other operational information can include provisioning information of mobile devices served through wireless platform network 1010, subscriber databases; application intelligence, pricing schemes, e.g., promotional rates, flat-rate programs, couponing campaigns; technical specification(s) consistent with telecommunication protocols for operation of disparate radio, or wireless, technology layers; and so forth. Memory 1030 can also store information from at least one of telephony network(s) 1040, WAN 1050, enterprise network(s) 1060, or SS7 network 1070. In an aspect, memory 1030 can be, for example, accessed as part of a data store component or as a remotely connected memory store.

In order to provide a context for the various aspects of the disclosed subject matter, FIG. 10, and the following discussion, are intended to provide a brief, general description of a suitable environment in which the various aspects of the disclosed subject matter can be implemented. While the subject matter has been described above in the general context of computer-executable instructions of a computer program that runs on a computer and/or computers, those skilled in the art will recognize that the disclosed subject matter also can be implemented in combination with other program modules. Generally, program modules include routines, programs, components, data structures, etc. that perform particular tasks and/or implement particular abstract data types.

In the subject specification, terms such as "store," "storage," "data store," data storage," "database," and substantially any other information storage component relevant to operation and functionality of a component, refer to "memory components," or entities embodied in a "memory" or components comprising the memory. It will be appreciated that the memory components described herein can be either volatile memory or nonvolatile memory, or can include both volatile and nonvolatile memory, by way of illustration, and not limitation, volatile memory (see below), non-volatile memory (see below), disk storage (see below), and memory storage (see below). Further, nonvolatile memory can be included in read only memory (ROM), programmable ROM (PROM), electrically programmable ROM (EPROM), electrically erasable ROM (EEPROM), or flash memory. Volatile memory can include random access memory (RAM), which acts as external cache memory. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), and direct Rambus RAM (DRRAM). Additionally, the disclosed memory components of systems or methods herein are intended to comprise, without being limited to comprising, these and any other suitable types of memory.

Moreover, it will be noted that the disclosed subject matter can be practiced with other computer system configurations, including single-processor or multiprocessor computer systems, mini-computing devices, mainframe computers, as well as personal computers, hand-held computing devices (e.g., PDA, phone, watch, tablet computers, netbook computers, . . . ), microprocessor-based or programmable consumer or industrial electronics, and the like. The illustrated aspects can also be practiced in distributed computing environments where tasks are performed by remote processing devices that are linked through a communications network; however, some if not all aspects of the subject disclosure can be practiced on stand-alone computers. In a distributed computing environment, program modules can be located in both local and remote memory storage devices.

The embodiments described herein can employ artificial intelligence (AI) to facilitate automating one or more features described herein. The embodiments (e.g., in connection with automatically identifying acquired cell sites that provide a maximum value/benefit after addition to an existing communication network) can employ various AI-based schemes for carrying out various embodiments thereof. Moreover, the classifier can be employed to determine a ranking or priority of the each cell site of the acquired network. A classifier is a function that maps an input attribute vector, $x=(x1, x2, x3, x4, \ldots, xn)$, to a confidence that the input belongs to a class, that is, $f(x)=confidence$ (class). Such classification can employ a probabilistic and/or statistical-based analysis (e.g., factoring into the analysis utilities and costs) to prognose or infer an action that a user desires to be automatically performed. A support vector machine (SVM) is an example of a classifier that can be employed. The SVM operates by finding a hypersurface in the space of possible inputs, which the hypersurface attempts to split the triggering criteria from the non-triggering events. Intuitively, this makes the classification correct for testing data that is near, but not identical to training data. Other directed and undirected model classification approaches include, e.g., naïve Bayes, Bayesian networks, decision trees, neural networks, fuzzy logic models, and probabilistic classification models providing different patterns of independence can be employed. Classification as used herein also is inclusive of statistical regression that is utilized to develop models of priority.

As will be readily appreciated, one or more of the embodiments can employ classifiers that are explicitly trained (e.g., via a generic training data) as well as implicitly trained (e.g., via observing UE behavior, operator preferences, historical information, receiving extrinsic information). For example, SVMs can be configured via a learning or training phase within a classifier constructor and feature selection module. Thus, the classifier(s) can be used to automatically learn and perform a number of functions, including but not limited to determining according to a predetermined criteria which of the acquired cell sites will benefit a maximum number of subscribers and/or which of the acquired cell sites will add minimum value to the existing communication network coverage, etc.

As used in this application, in some embodiments, the terms "component," "system" and the like are intended to refer to, or include, a computer-related entity or an entity related to an operational apparatus with one or more specific functionalities, wherein the entity can be either hardware, a combination of hardware and software, software, or software in execution. As an example, a component may be, but is not limited to being, a process running on a processor, a processor, an object, an executable, a thread of execution, computer-executable instructions, a program, and/or a computer. By way of illustration and not limitation, both an application running on a server and the server can be a component. One or more components may reside within a process and/or thread of execution and a component may be localized on one computer and/or distributed between two or more computers. In addition, these components can execute from various computer readable media having various data structures stored thereon. The components may communicate via local and/or remote processes such as in accordance with a signal having one or more data packets (e.g., data from one component interacting with another component in a local system, distributed system, and/or across a network such as the Internet with other systems via the signal). As another example, a component can be an apparatus with specific functionality provided by mechanical parts operated by electric or electronic circuitry, which is operated by a software or firmware application executed by a processor, wherein the processor can be internal or external to the apparatus and executes at least a part of the software or firmware application. As yet another example, a component can be an apparatus that provides specific functionality through electronic components without mechanical parts, the electronic components can include a processor therein to execute software or firmware that confers at least in part the functionality of the electronic components. While various components have been illustrated as separate components, it will be appreciated that multiple components can be implemented as a single component, or a single component can be implemented as multiple components, without departing from example embodiments.

Further, the various embodiments can be implemented as a method, apparatus or article of manufacture using standard programming and/or engineering techniques to produce software, firmware, hardware or any combination thereof to control a computer to implement the disclosed subject matter. The term "article of manufacture" as used herein is intended to encompass a computer program accessible from any computer-readable device or computer-readable storage/communications media. For example, computer readable storage media can include, but are not limited to, magnetic storage devices (e.g., hard disk, floppy disk, magnetic strips), optical disks (e.g., compact disk (CD), digital versatile disk (DVD)), smart cards, and flash memory devices (e.g., card, stick, key drive). Of course, those skilled in the art will recognize many modifications can be made to this configuration without departing from the scope or spirit of the various embodiments.

In addition, the words "example" and "exemplary" are used herein to mean serving as an instance or illustration. Any embodiment or design described herein as "example" or "exemplary" is not necessarily to be construed as preferred or advantageous over other embodiments or designs. Rather, use of the word example or exemplary is intended to present concepts in a concrete fashion. As used in this application, the term "or" is intended to mean an inclusive "or" rather than an exclusive "or". That is, unless specified otherwise or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims should generally be construed to mean "one or more" unless specified otherwise or clear from context to be directed to a singular form.

Moreover, terms such as "user equipment," "mobile station," "mobile," "subscriber station," "access terminal," "terminal," "handset," "mobile device" (and/or terms representing similar terminology) can refer to a wireless device utilized by a subscriber or user of a wireless communication service to receive or convey data, control, voice, video, sound, gaming or substantially any data-stream or signaling-stream. The foregoing terms are utilized interchangeably herein and with reference to the related drawings.

Furthermore, the terms "user," "subscriber," "customer," "consumer" and the like are employed interchangeably throughout, unless context warrants particular distinctions among the terms. It should be appreciated that such terms can refer to human entities or automated components supported through artificial intelligence (e.g., a capacity to make inference based, at least, on complex mathematical formalisms), which can provide simulated vision, sound recognition and so forth.

As employed herein, the term "processor" can refer to substantially any computing processing unit or device comprising, but not limited to comprising, single-core processors; single-processors with software multithread execution capability; multi-core processors; multi-core processors with software multithread execution capability; multi-core processors with hardware multithread technology; parallel platforms; and parallel platforms with distributed shared memory. Additionally, a processor can refer to an integrated circuit, an application specific integrated circuit (ASIC), a digital signal processor (DSP), a field programmable gate array (FPGA), a programmable logic controller (PLC), a complex programmable logic device (CPLD), a discrete gate or transistor logic, discrete hardware components or any combination thereof designed to perform the functions described herein. Processors can exploit nano-scale architectures such as, but not limited to, molecular and quantum-dot based transistors, switches and gates, in order to optimize space usage or enhance performance of user equipment. A processor can also be implemented as a combination of computing processing units.

What has been described above includes mere examples of various embodiments. It is, of course, not possible to describe every conceivable combination of components or methodologies for purposes of describing these examples, but one of ordinary skill in the art can recognize that many further combinations and permutations of the present embodiments are possible. Accordingly, the embodiments disclosed and/or claimed herein are intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

What is claimed is:

1. A system, comprising:
a processor; and
a memory that stores executable instructions that, when executed by the processor, facilitate performance of operations, comprising:
establishing a defined length of time for suspension of data transmissions during a communication protocol reselecting process; and
in response to determining that a mobile device is reselecting a mobile network communication from a first communication protocol to a second communication protocol:
adjusting the defined length of time to an adjusted length of time determined to be needed to complete the reselecting of the mobile network communication from the first communication protocol to the second communication protocol,
suspending data transmissions of the mobile device using the first communication protocol for the adjusted length of time,
buffering, during the reselecting, data associated with the data transmissions resulting in buffered data,
in response to determining that a buffer associated with the buffering the data transmissions is full during the adjusted length of time and before the reselecting has been determined to have completed, resuming a data transmission of the data transmissions using the first communication protocol, and
resuming the data transmissions using the second communication protocol in response to determining that the reselecting of the mobile network communication from the first communication protocol to the second communication protocol has been completed.

2. The system of claim 1, wherein the operations further comprise:
enabling a data transmission of the data transmissions that satisfies a criterion relating to priority of transmission during the adjusted length of time.

3. The system of claim 1, wherein the first communication protocol is a third generation (3G) communications protocol and the second communication protocol is a fourth generation (4G) communications protocol.

4. The system of claim 1, wherein the resuming the data transmissions comprises resuming the data transmissions using the buffered data.

5. The system of claim 1, wherein the operations further comprise:
in response to determining that a buffer associated with the buffering the data transmissions is full and before the reselecting has been determined to have completed, terminating a packet session associated with a data transmission of the data transmissions.

6. The system of claim 1, wherein the operations further comprise:
blocking an incoming packet page to the mobile device during the adjusted length of time.

7. The system of claim 6, wherein the operations further comprise:
resuming the incoming packet page after the adjusted length of time.

8. A method, comprising:
obtaining, by a device comprising a processor, information representative of a predetermined period of time for suspending data transmissions during a communication protocol reselecting process; and
in response to determining, by the device, that a reselecting of a mobile network communication from using a first communication protocol to using a second communication protocol has initiated:
adjusting, by the device, the information representative of the predetermined period of time to adjust information representative of an adjusted period of time determined to be needed to complete the reselecting of the mobile network from using the first communication protocol to using the second communication protocol,
suspending, by the device, a first transmission of data in the first communication protocol from the device for the adjusted period of time,
buffering, by the device during the reselecting, the data associated with the first transmission,
resuming, by the device during the reselecting and during the adjusted period of time, the first transmission using the first communication protocol before the reselecting has completed in response to determining a data buffer associated with the data being buffered is full, and
resuming, by the device, the first transmission according to the second communication protocol in response to determining that the reselecting from using the first communication protocol to using the second communication protocol has been completed.

9. The method of claim 8, further comprising:
sending, by the device during the reselecting and during the adjusted period of time, a second transmission of data satisfying a defined condition relating to a priority ranking, wherein the first transmission is determined not to satisfy the defined condition, and the second transmission is enabled before the reselecting has been completed.

10. The method of claim 9, further comprising:
resuming, by the device during the reselecting and during the adjusted period of time, the first transmission using the first communication protocol in response to determining that a priority ranking associated with the first transmission has changed and satisfies the defined condition.

11. The method of claim 8, wherein the resuming the first transmission according to the second communication protocol comprises transmitting the data that was buffered since the reselecting began.

12. The method of claim 8, wherein the suspending the first transmission of data further comprises:
disconnecting, by the device, a packet session associated with the first transmission of data.

13. The method of claim 8, wherein the adjusted period of time is based on the first communication protocol and the second communication protocol.

14. A non-transitory machine-readable storage medium, comprising executable instructions that, when executed by a processor, facilitate performance of operations, comprising:
establishing a predetermined period of time for suspension of data transmissions during a communication protocol reselecting process; and
in response to determining that a reselecting of a mobile network from using a first communication protocol to using a second communication protocol has initiated by a device:
adjusting the predetermined period of time to an adjusted period of time specifically determined to be needed to complete the reselecting of the mobile network from using the first communication protocol to using the second communication protocol, suspending a first transmission of data transmitted according to the first communication protocol from the device for the adjusted period of time, buffering, during the reselecting, the data associated with the first transmission, resuming, during the reselecting and during the adjusted period of time, the first transmission using the first communication protocol before the reselecting has completed in response to determining a data buffer associated with the data being buffered is full, and resuming the first transmission according to the second communication protocol in response to determining that the reselecting from using the first communication protocol to using the second communication protocol has been completed.

15. The non-transitory machine-readable storage medium of claim 14, wherein the operations further comprise:

sending, during the reselecting and during the adjusted period of time, a second transmission of data satisfying a predetermined condition relating to a priority ranking before the reselecting has completed.

* * * * *